United States Patent
Fink et al.

(10) Patent No.: US 11,194,572 B2
(45) Date of Patent: Dec. 7, 2021

(54) MANAGING EXTERNAL FEEDS IN AN EVENT-BASED COMPUTING SYSTEM

(71) Applicant: International Business Machines Corporation, Armonk, NY (US)

(72) Inventors: Stephen Fink, Yorktown Heights, NY (US); Hoang Anh Le, Karlsruhe (DE); Vinod Muthusamy, Peekskill, NY (US); Rodric Rabbah, Somers, NY (US); Jeremias Werner, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 15/374,201

(22) Filed: Dec. 9, 2016

(65) Prior Publication Data

US 2017/0242737 A1   Aug. 24, 2017

Related U.S. Application Data

(60) Provisional application No. 62/298,093, filed on Feb. 22, 2016, provisional application No. 62/298,194, filed on Feb. 22, 2016.

(51) Int. Cl.
*G06F 8/71* (2018.01)
*G06F 9/54* (2006.01)
(Continued)

(52) U.S. Cl.
CPC ............ *G06F 8/71* (2013.01); *G06F 8/31* (2013.01); *G06F 8/41* (2013.01); *G06F 9/542* (2013.01)

(58) Field of Classification Search
CPC .................................................. G06F 9/542
See application file for complete search history.

(56) References Cited

U.S. PATENT DOCUMENTS 8,176,469 B2   5/2012   Lucas
8,510,728 B2   8/2013   Burckart et al.
(Continued)

FOREIGN PATENT DOCUMENTS

WO   WO2003036464   5/2003

OTHER PUBLICATIONS

GitHub. Downloaded from https://en.wikipedia.org/wiki/GitHub on Nov. 17, 2016. pp. 1-6.

(Continued)

*Primary Examiner* — Doon Y Chow
*Assistant Examiner* — Carina Yun
(74) *Attorney, Agent, or Firm* — Samuel Waldbaum; Otterstedt, Wallace & Kammer, LLP (57) ABSTRACT

At a cloud platform, a class of feed is received for an external feed corresponding to an information source, as are an instruction corresponding to a create operation for the external feed, and a dictionary input corresponding to parameters expected by the information source. The external feed produces a corresponding class of events. At the cloud platform, a handler is selected based on the received class of feed and the received create operation; the input dictionary is transferred to the handler; and the handler generates a unique destination to receive events for the class of events. The handler on the cloud platform generates a unique request to the information source to generate events of the class of feed to the unique destination and sends the request to the information source. Events generated from the information source responsive to the unique request are received at the unique destination.

20 Claims, 7 Drawing Sheets

(51) Int. Cl.
*G06F 8/30* (2018.01)
*G06F 8/41* (2018.01)

(56) References Cited

U.S. PATENT DOCUMENTS

| | | | |
|---|---|---|---|
| 9,916,137 | B2 | 3/2018 | Chouhan |
| 9,928,108 | B1 | 3/2018 | Wagner et al. |
| 2006/0041871 | A1 | 2/2006 | Friedman et al. |
| 2008/0295070 | A1 | 11/2008 | Bozza et al. |
| 2009/0157627 | A1* | 6/2009 | Arthursson ......... G06F 9/45504 |
| 2009/0177700 | A1 | 7/2009 | Grimm, III et al. |
| 2010/0088669 | A1 | 4/2010 | Cwalina et al. |
| 2012/0113264 | A1 | 5/2012 | Moshrefi et al. |
| 2013/0018955 | A1* | 1/2013 | Thaxton .............. G06F 17/3089 709/204 |
| 2013/0254314 | A1* | 9/2013 | Chow .................... H04L 67/06 709/206 |
| 2014/0053150 | A1 | 2/2014 | Barnett et al. |
| 2014/0068549 | A1 | 3/2014 | Friedman et al. |
| 2014/0344112 | A1 | 11/2014 | Smedberg et al. |
| 2015/0128105 | A1 | 5/2015 | Sethi et al. |
| 2015/0135167 | A1 | 5/2015 | Berk et al. |
| 2015/0143260 | A1* | 5/2015 | Bailey .................... G06Q 50/01 715/753 |
| 2016/0124731 | A1 | 5/2016 | Hill, III |
| 2017/0242689 | A1 | 8/2017 | Cheng et al. |
| 2017/0337054 | A1 | 11/2017 | Parees et al. |
| 2018/0039412 | A1 | 2/2018 | Singh et al. |
| 2018/0039506 | A1 | 2/2018 | Wagner et al. |
| 2018/0121195 | A1 | 5/2018 | Cheng et al. |

OTHER PUBLICATIONS

Gero Muhl et al., Distributed Event-Based Systems. Springer-Verlag Berlin Heidelberg 2006, pp. I-XIX and 1-384.

Peter Mell & Timothy Grance, The NIST Definition of Cloud Computing. Special Publication 800-145, Sep. 2011. cover, pp. i-iii and 1-3.

Anonymous, IBM OpenWhisk Cloudfirst distributed event-based programming service High Level Architecture, downloaded Nov. 25, 2016 from https://developer.ibm.com/openwhisk/, pp. 1-4.

Perry S. Cheng et al., unpublished U.S. Appl. No. 15/438,444, filed Feb. 21, 2017 pp. 1-30 plus 6 sheets drawings.

List of IBM Patents or Patent Applications Treated as Related, pp. 1-2, Mar. 2, 2017.

Wikipedia,Web server, downloaded Feb. 8, 2017 from https://en.wikipedia.org/wiki/Web_server pp. 1-5.

Wikipedia,Docker (software), downloaded Jan. 11, 2016 from https://en.wikipedia.org/wiki/Docker_(software) pp. 1-6.

Stratos Dimopoulos, Thrift Tutorial Release 1.0, Jan. 31, 2016, pp. i-11, 1-49.

Mark Slee et al., Thrift: Scalable Cross-Language Services Implementation, Facebook, Apr. 1, 2007, pp. 1-8.

Hablog, λm.xyz, My Take on Functional Programming, Jan. 9, 2014, pp. 1-4.

Anon., What is Docker?, pp. 1-4, downloaded from https://www.docker.com/what-docker Aug. 2, 2017.

Jeff Nickoloff, Building Docker Images From a Container, Jul. 10, 2015, developer.com Staff, pp. 1-7.

Anonymous, Best practices for writing Dockerfiies, pp. 1-16, https://docs .docker.com/v 1 7 .09/engine/userguide/eng-image/dockerfile _best-practices/[ Apr. 30, 2018 7: 54: 06 AM], cached Feb. 12, 2015.

Bluemix Launches IBM Containers Beta Based on Docker, Jason McGee, Dec. 4, 2014, https://www .ibm.com/blogs/bluemix/2014/12/ibm-containers-beta-docker/[ Apr. 29, 2018 4: 34:03 PM], pp. 1-12.

Paul J. Otterstedt, List of IBM Patents or Patent Applications Treated as Related (Updated), pp. 1-2, Jul. 24, 2018.

\* cited by examiner

```
43  if (lifecycleEvent === 'CREATE') {
44      var events = params.events.split(',');
45
46      var body = {
47          name: 'web',
48          active: true,
49          events: events,
50          config: {
51              url: whiskCallbackUrl,
52              content_type: 'json'
53          }
54      };
55
56      var options = {
57          method: 'POST',
58          url: registrationEndpoint,
59          body: JSON.stringify(body),
60          headers: {
61              'Content-Type': 'application/json',
62              'Authorization': authorizationHeader,
63              'User-Agent': 'whisk'
64          }
65      };
66      var promise = new Promise(function(resolve, reject) {
67          request(options, function (error, response, body) {
68              if (error) {
```

FIG. 8

MANAGING EXTERNAL FEEDS IN AN EVENT-BASED COMPUTING SYSTEM

CROSS-REFERENCE TO RELATED APPLICATIONS

This application claims the benefit of U.S. Provisional Patent Application 62/298,194, filed 22 Feb. 2016, entitled Managing External Feeds in an Event-Based Computing System, and also claims the benefit of U.S. Provisional Patent Application 62/298,093, filed 22 Feb. 2016, entitled Language-Independent Program Composition using Containers. The complete disclosures of U.S. Provisional Patent Application 62/298,194 and U.S. Provisional Patent Application 62/298,093 are expressly incorporated by reference herein in their entireties for all purposes.

BACKGROUND

The present invention relates to the electrical, electronic and computer arts, and, more particularly, to cloud programming models, runtimes and integration, including, for example, application and integration middleware and the like.

In the realm of event-based computing processing systems, a programming model is provided whereby a user specifies a "handler" function, and registers the handler to run in response to certain events that arise. A distributed event-based system manages the delivery of events and management of handler code, to ensure that handlers execute in response to events.

Typically, event-based computing is employed to handle events that arise from some external source, called a "feed." Examples of feeds include price quotes from an equity trading service, news bulletins from a news aggregator, or notifications from a source code control system.

In order to use a feed, the feed must typically be configured externally. That is, there must be interaction with some management service from the feed provider, to select a certain stream of events and configure the service to send those events to the event-based computing system desired.

In this model, a user of an event-based computing system must interact with a separate management system and interface for each feed the user desires to consume. Since each feed management system is different, this introduces a burden on the user. See, e.g., Gero Mühl et al., Distributed Event-Based Systems, Springer-Verlag Berlin Heidelberg 2006, expressly incorporated by reference herein in its entirety for all purposes.

SUMMARY

Principles of the invention provide techniques for managing external feeds in an event-based computing system. In one aspect, an exemplary method includes the step of receiving, at a cloud platform, a class of feed for an external feed corresponding to an information source (the external feed to produce a corresponding class of events). Further steps include receiving, at the cloud platform, an instruction corresponding to a create operation for the external feed; receiving, at the cloud platform, a dictionary input corresponding to parameters expected by the information source; selecting, at the cloud platform, a handler based on the received class of feed and the received create operation; transferring, to the handler on the cloud platform, the input dictionary; generating, at the cloud platform, a unique destination to receive events for the class of events; generating, by the handler on the cloud platform, a unique request to the information source to generate events of the class of feed to the unique destination; sending, by the handler on the cloud platform, the request to the information source; and receiving, at the unique destination, events generated from the information source responsive to the unique request.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

end user can consume an external feed without needing to know details of how to manage same;

a feed management application programming interface (API) can be encapsulated as an event handler which responds to lifecycle events on the feed, transparently to the end user;

feeds, encapsulated by lifecycle handlers, can be managed, organized, and queried like other event handlers.

These and other features and advantages of the present invention will become apparent from the following detailed description of illustrative embodiments thereof, which is to be read in connection with the accompanying drawings.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
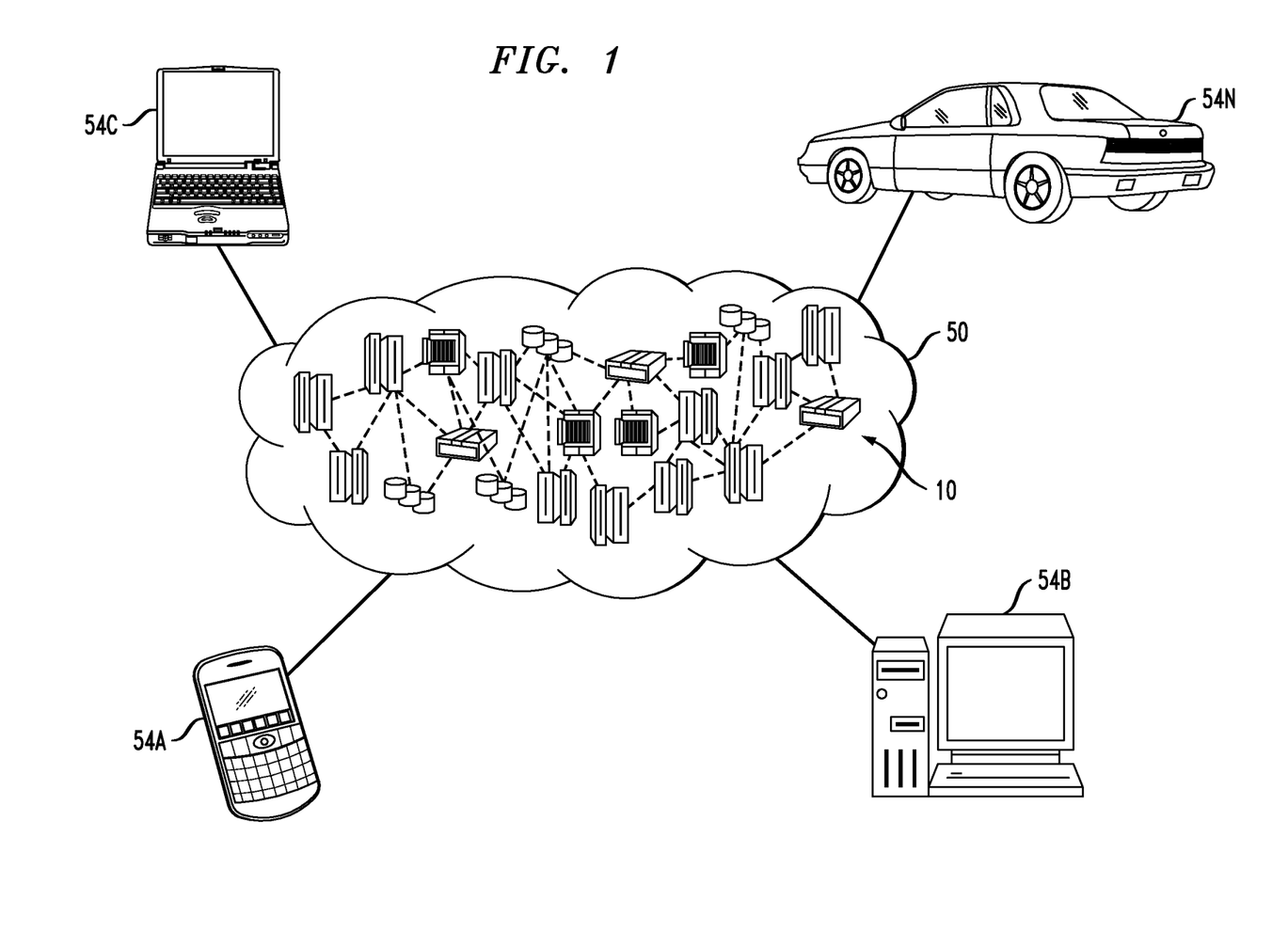
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
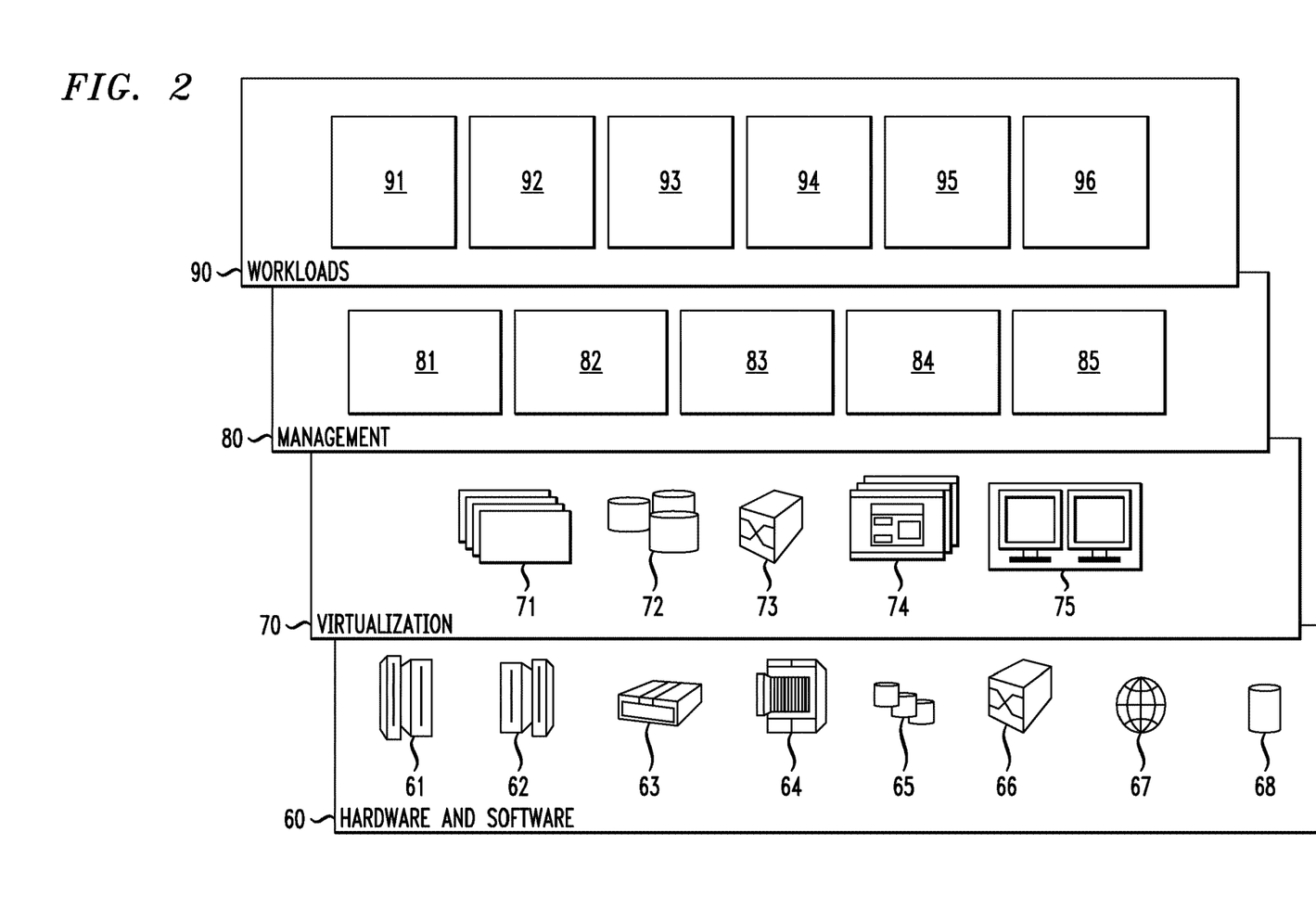
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software elements of an event-based computing system 96, according to an aspect of the invention.

Note that while FIG. 2 shows servers, some embodiments of the invention are implemented in a serverless fashion, as discussed herein.

As noted, in the realm of event-based computing processing systems, a programming model is provided whereby a user specifies a "handler" function, and registers the handler to run in response to certain events that arise. A distributed event-based system manages the delivery of events and management of handler code, to ensure that handlers execute in response to events.

Typically, event-based computing is employed to handle events that arise from some external source, called a "feed." Examples of feeds include price quotes from an equity trading service, news bulletins from a news aggregator, or notifications from a source code control system.

In order to use a feed, the feed must typically be configured externally. That is, there must be interaction with some management service from the feed provider, to select a certain stream of events and configure the service to send those events to the event-based computing system desired.

In this model, a user of an event-based computing system must interact with a separate management system and interface for each feed the user desires to consume. Since each feed management system is different, this introduces a burden on the user.

Figure 3:
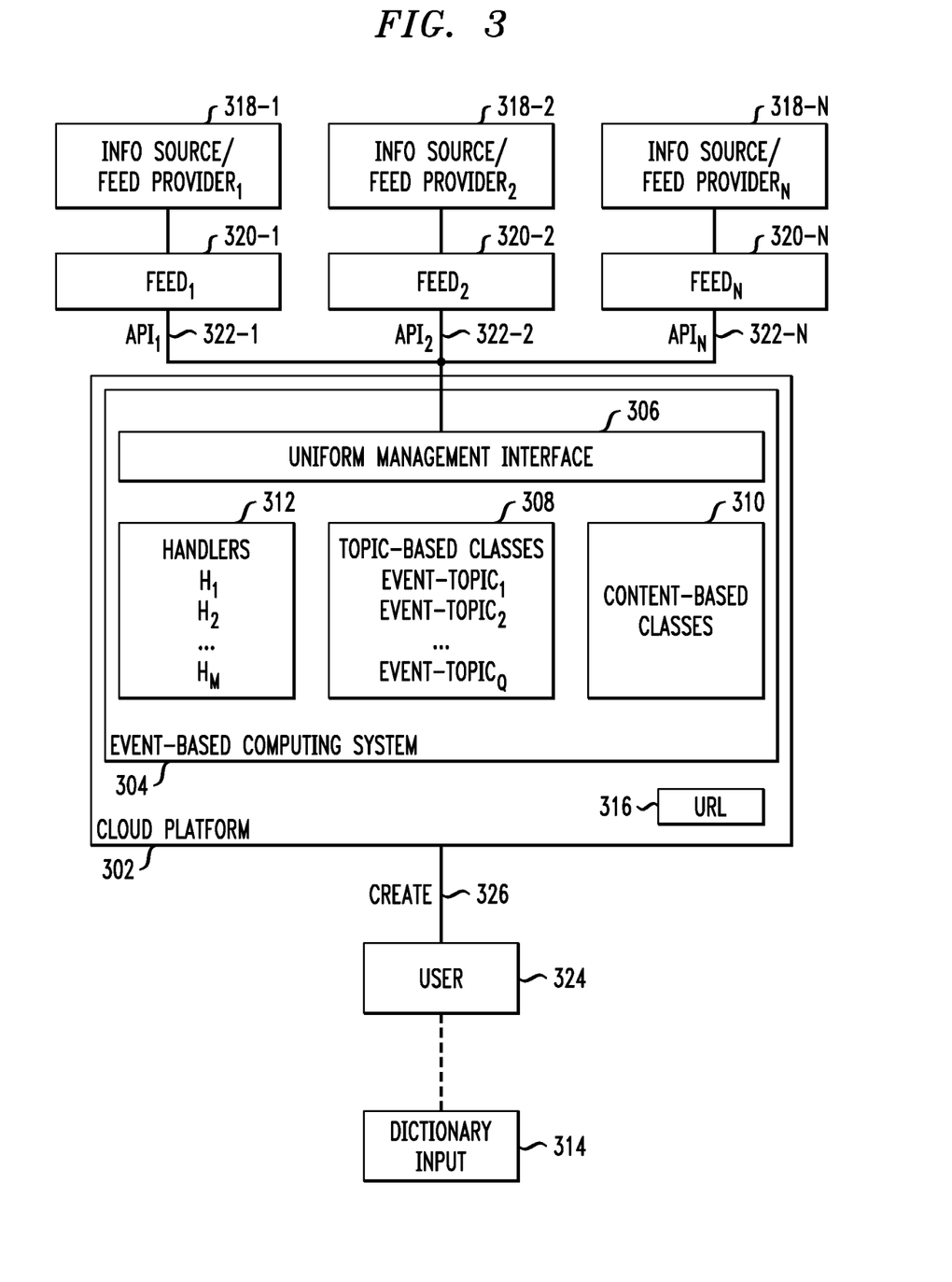
FIG. 3 is a block diagram of an exemplary event-based computing system according to an embodiment of the present invention.

Referring now to FIG. 3, one or more embodiments advantageously allow the event-based computing system 304 to present a unified management interface 306 for external feeds (e.g., $FEED_1$ 320-1, $FEED_2$ 320-2 ... $FEED_N$ 320-N; collectively 320). Because of the lack of standards for feed management interfaces, current techniques have been unable to provide a uniform interface to arbitrary disparate feed sources.

One or more embodiments provide techniques whereby an event-based processing system can present a uniform interface to feed management services from arbitrary feed providers (e.g., INFORMATION SOURCE/FEED PROVIDER$_1$ 318-1, INFORMATION SOURCE/FEED PROVIDER$_2$ 318-2 ... INFORMATION SOURCE/FEED PROVIDER$_N$ 318-N; collectively 318). One significant aspect is that the system can represent key lifecycle events for a feed as events managed by the system, and let the feed providers provide event handlers that the system knows how to manage in the context of its event-based programming model.

One or more embodiments assume an event-based computing system where any user (e.g., end user 324 or one of the feed providers 318) can define a "handler" 312, which is a piece of code that runs in response to certain events. Additionally, the system provides a mechanism to define a class of events based on some criterion. The simplest models are "topic-based" classes 308, where each event is tagged with a "topic," and the topic defines a class. Other models, such as "content-based" classes 310, are also possible. Furthermore in this regard, a feed is a stream of events. If it is desired to associate an event handler with it, it is appropriate to specify which events are of interest. Reference is made to the well-known model of publish-subscribe ("pub-sub") computation. In topic-based pub-sub, a user specifies interest in all messages with a certain topic (e.g., "food"), essentially via a tagging process (look for messages tagged "food"). Content-based pub-sub provides a richer language for describing events of interest. For instance, rather than merely specifying interest in all messages tagged "food," one could indicate an interest in all events which are tagged "food" and which occurred between September and October near New York. Thus, in the content-based pub-sub model, besides merely expressing interest in the tag or topic of the message, the properties of the message itself (content) can be described. Embodiments of the invention can be used with topic-based approaches and/or content-based approaches. Purely for illustrative purposes, a non-limiting topic-based exemplary embodiment will be described. However, given the teachings herein, the skilled artisan will also be enabled to implement content-based approaches.

One or more embodiments also assume that users can publish handlers 312 visible and callable by other users. For example, one of the feed providers 318 may publish a handler 312 that can be called by end user 324 who wishes to consume a corresponding feed.

Consider now a non-limiting example of how to manage external feeds 320.

In one or more embodiments, the system 304 defines a small set of "lifecycle" events for each class 308 of feed 320. In one embodiment, the set of lifecycle events for a feed could be {CREATE, DELETE, PAUSE, RESUME}.

Next, the feed provider 318 defines a handler 312 for each of the lifecycle events associated for the feed provider's feed. Alternatively, the feed provider can provide a single handler which responds to the various lifecycle events as appropriate for each event. Since the event-based computing system 304 allows arbitrary code as handlers, the feed provider 318 can place arbitrary code as the handler 312 for each lifecycle event. For the subsequent discussion, assume a separate handler for each lifecycle event on a feed; however, the same principles apply for the case of a single handler which can handle all events, and takes the particular type of event as input.

Accordingly, the CREATE handler 312 for a feed can, for example, negotiate with a feed provider's service 318 via any arbitrary application programming interface (API) (e.g., $API_1$ 322-1, $API_2$ 322-2 ... $API_N$ 322-N; collectively, 322) to establish a feed of events, and arrange for these events to flow to the event-based computing service 304. Similarly, the DELETE handler could negotiate with a feed provider's service to destroy a feed of events, and PAUSE and UNPAUSE handlers can negotiate with a feed provider's service to place the feed in an appropriate state.

Pertinent benefits to the user 324 in one or more embodiments include:

The user 324 need not worry about the details of how to create, delete, or otherwise manage a particular feed 320. Instead, the feed provider 318 encapsulates the details in the handler 312 for a lifecycle event. The user 324 need only generate a CREATE event (or other lifecycle event) with parameters as expected by the handler 312, and be confident that the feed is created as expected.

If the feed management API 322 changes, the changes can be encapsulated in a change to the lifecycle handler 312—users 324 of the handler need not know.

The feeds 320, as encapsulated by lifecycle handlers 312, can be managed, organized, and queried just like all the other event handlers in the system.

Furthermore, in one or more embodiments, the system can automatically hide some details relating to setting up integrations between feed providers 318 and the event-based computing system 304. For example, suppose that the system uses topic-based event classes 308—the system can automatically pass the information relevant to a topic (e.g. URL, credentials, etc.) to the feed handler 312, without any participation by an end user 324.

Consider now one non-limiting example of how to employ an exemplary embodiment of the invention; in particular, an example of an application that can be built using an exemplary embodiment of the invention. Again, by way of review, one or more embodiments are directed to managing feeds. Consider the GitHub web-based repository hosting service, which is one non-limiting example of a service that could provide a feed which people might be interested in. GitHub is a popular site that allows people to host their source code and manage development of their code. The user can instruct the GitHub site to publish events when something interesting happens; e.g., change in the code, opening of an issue against the code, some other interesting event in the life cycle of the code, and the like. One non-limiting example of a feed that could be handled with embodiments if the invention is the case where the GitHub site is configured to publish a stream of events which are of interest to a code developer regarding management of his or her source code. An embodiment of the invention could be used to write software that would make it easy to manage that feed; in particular, in a serverless system.

For example, consider use of the OpenWhisk serverless event-based programming service to create a simple but useful "bot" for the messaging platform Slack. The following non-limiting example describes an embodiment utilizing the OpenWhisk event-driven programming system (reference is made to the OpenWhisk project, which contains the source code behind IBM Bluemix OpenWhisk). OpenWhisk provides a cloud-native event-based programming system where event handlers are called actions. The following non-limiting example uses OpenWhisk command-line statements to manipulate actions and feeds. In the example, the application, including Whisk actions, waits for events on the GitHub platform. When a change is made to the code hosted on the GitHub platform, the application processes the information about the change and publishes it to a channel on Slack. In such an environment, actions can be invoked not only from the command line but also automatically. One possibility to invoke an action is to call it directly from the code of another action. For example, using JavaScript code, an action "gitToSlack" can be created and then invoked when desired.

Consider binding of the git package. To obtain information about changes on GitHub the "github" package can be employed. Inasmuch as some information is required, also create an own binding of this package. In this non-limiting example, the GitHub username, a repository, and an accessToken are required:

wsk package bind /whisk.system/github myGit -p username $USERNAME -p repository $REPOSITORY This will create a package binding called myGit with the pertinent information in order to set up a webhook on the repository, which will deliver information about changes to whisk.

Consider further creating a trigger to listen on GitHub changes. Triggers are a named channel for a stream of events. A trigger can be configured with a feed that sets up the source of events; in this non-limiting example, GitHub. The action "webhook" is part of the github package and takes a comma-separated list of events as an input. In this non-limiting example, it is only desired to know when people push changes to the repository.

wsk trigger create myGitTrigger--feed myGit/webhook -p events push

The new trigger is called myGitTrigger. On creating the trigger, execute the feed webhook. It creates a Webhook in GitHub that calls the trigger when someone performs a push to the repository. Now all pushes on GitHub will fire the newly created trigger.

Figure 4:
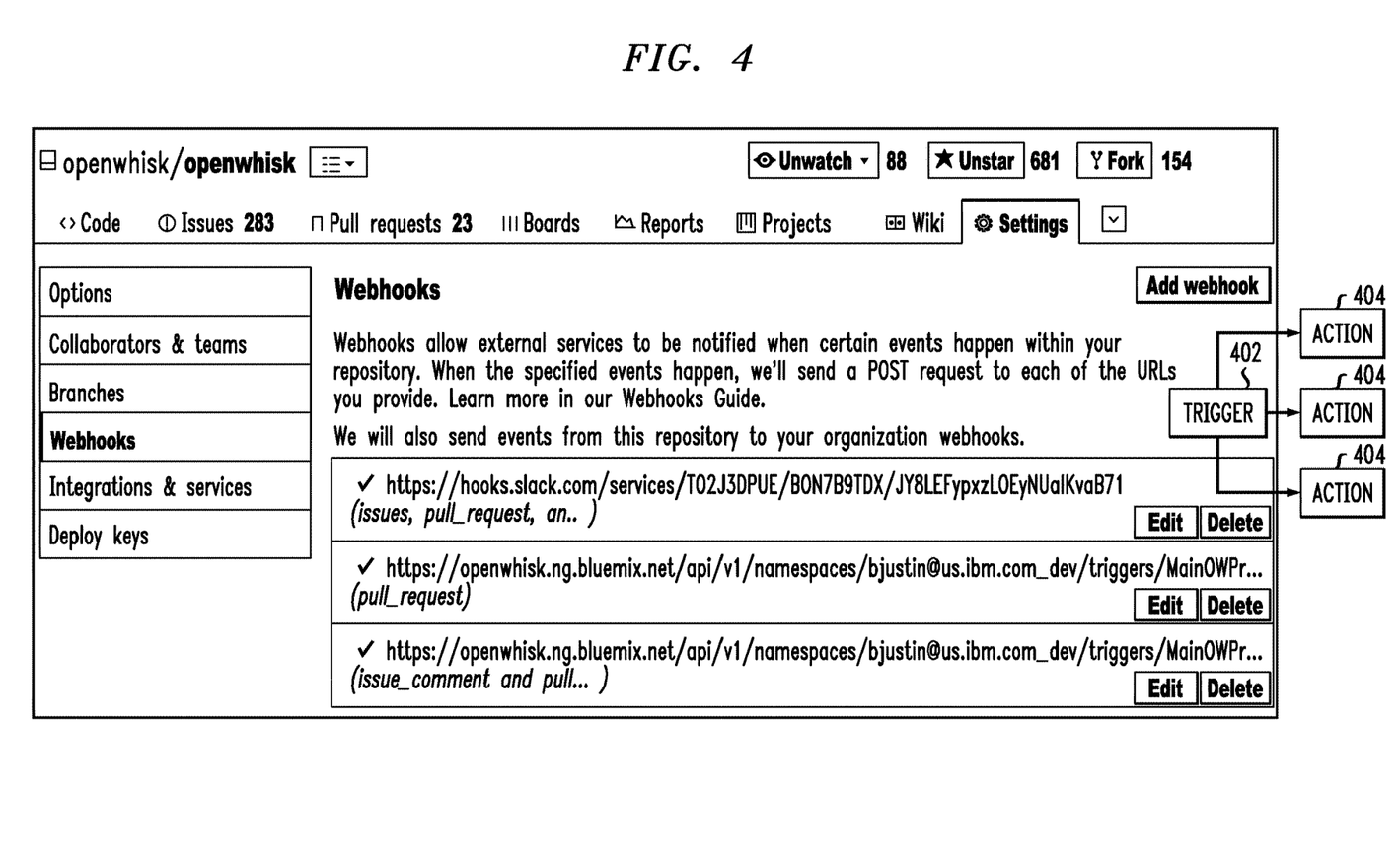
FIG. 4 is a custom feed example, according to an aspect of the invention.

Furthermore with regard to implementation of feeds, FIG. 4 presents a non-limiting custom feed example using a repository hosting service such as GitHub. As shown at 402, webhooks trigger one or more actions 404. Notification may be of interest, for example, in cases of push, fork, comment, and the like. In a non-limiting example using OpenWhisk feeds, a user binds a package with his or her credentials (parameters):

wsk package bind /whisk.system/github myGit --param username
myGitUser --param repository myGitRepo --param accessToken
aaaaa1111a1a1a1a1a111111aaaaaa1111aa1a1a The user then creates a trigger (instantiates a stream of events):

wsk trigger create myGitTrigger --feed myGit/webhook --param
events push

Even further, the user creates a rule (hooks a trigger to an action):

wsk rule create R myGitTrigger myAction

The user is thus readily enabled to create a package with a feed, e.g., /mynamespace/github.

Figure 5:
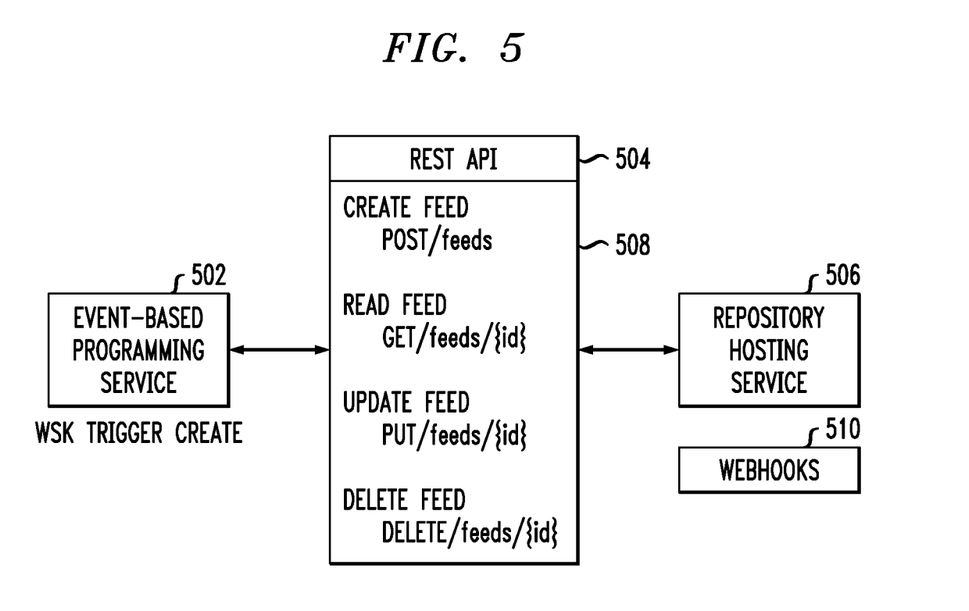
FIGS. 5 and 6 show logical architectures of a github feed service, according to aspects of the invention.

FIG. 5 shows a logical architecture of a github feed service. An event-based programming service 502, such as Whisk, is employed and a trigger is created as discussed above. Access to a repository hosting service 506 such as GitHub is via representational state transfer (REST) API 504. As seen at 508, actions include create, read, update, and delete. Webhooks 510 are shown in detail in FIG. 4.

Figure 6:
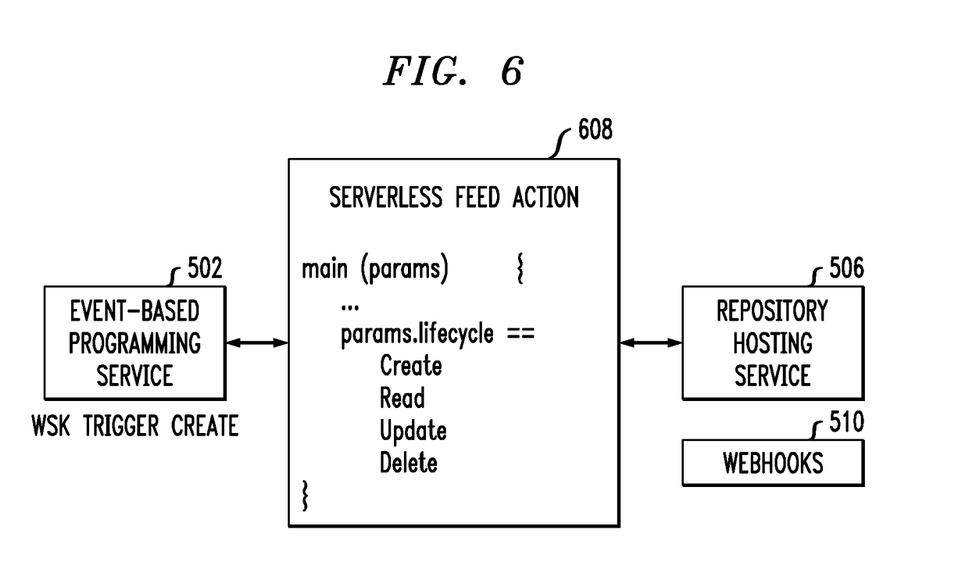

FIG. 6 shows an alternative logical architecture of a github feed service. An event-based programming service 502, such as Whisk, is employed and a trigger is created as discussed above. Access to a repository hosting service 506 such as GitHub is via a serverless feed action. As seen at 608, actions include create, read, update, and delete. Webhooks 510 are shown in detail in FIG. 4.

Figure 7:
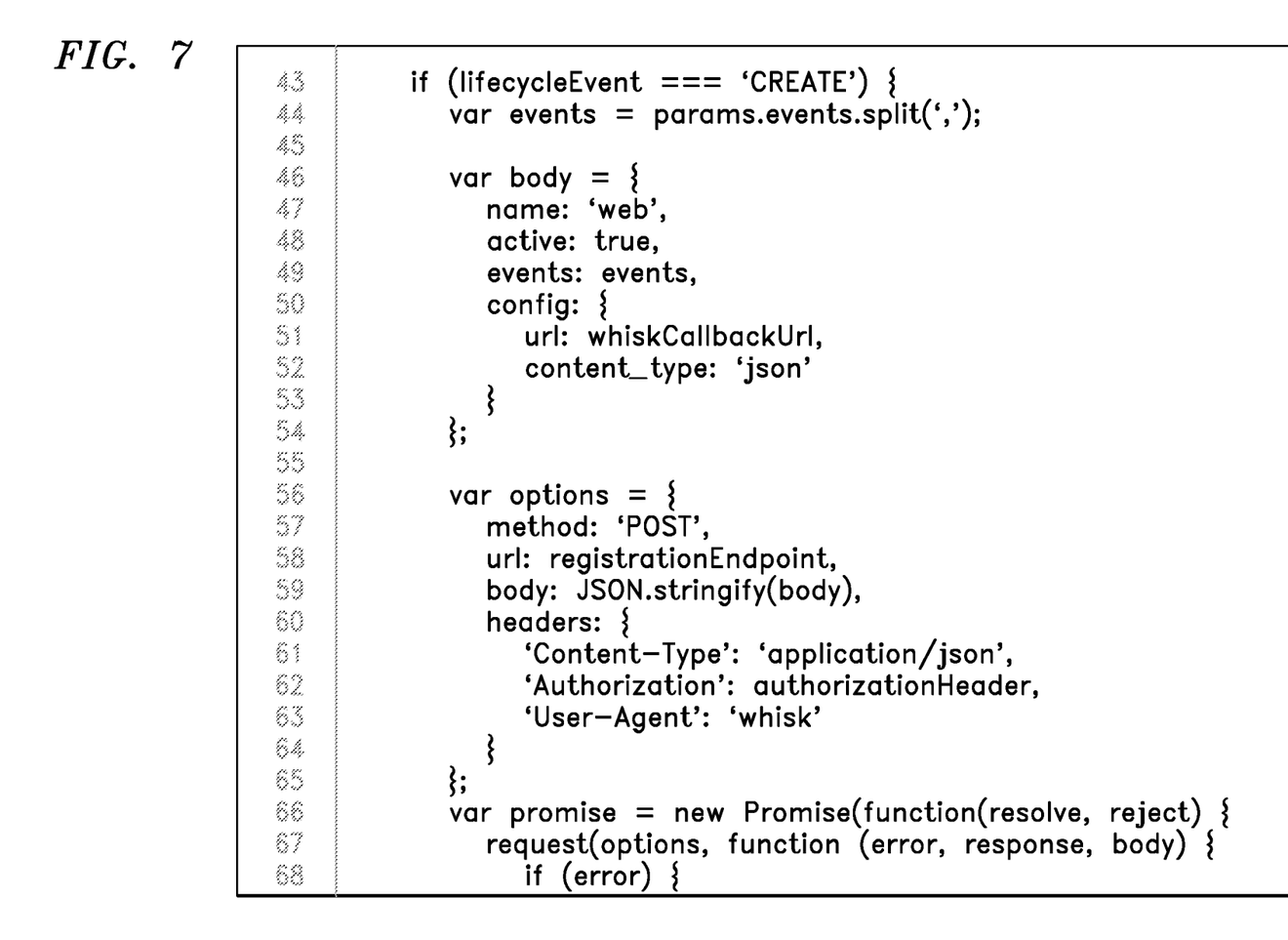
FIG. 7 shows aspects of a feed action, according to an aspect of the invention.

Referring to FIG. 7, which shows exemplary code, the skilled artisan will appreciate that a feed action is an OpenWhisk action which manages a feed:

wks trigger create myGitTrigger --feed myGit/webhook -param events push
      -> wsk action invoke myGit/webhook
      --param events push
      --param lifecycleEvent 'CREATE'
      --param triggerName myNamespace/myGitTrigger
      --param auth myAuthKey . . .

One pertinent aspect of one or more embodiments is the aspect of starting with a system that can execute functions as a building block and then encode feed management as an instance in the system and use it to plug into the system itself. While feed management itself is known, prior art systems do not teach or suggest a system that can execute functions in a serverless way with plug-in feed management, in a way that is extensible, native to the system, and provides a good user experience.

Advantageously, one or more embodiments are not specific to a media type, and/or allow data providers to define policies using a uniform process. Indeed, one or more embodiments allow data providers to broker their own connections with more than a CREATE feed; the user may DELETE, PAUSE and RESUME the feed.

It should be noted that GitHub is a non-limiting example of a web-based repository hosting service and other such services could be used in other embodiments; OpenWhisk is a non-limiting example of a serverless event-based programming service and other such services could be used in other embodiments; Slack is a non-limiting example of a messaging platform and other such platforms could be used in other embodiments; JavaScript is a non-limiting example of an interpreted programming language and other languages could be used in other embodiments; and a webhook, in web development, is a method of augmenting or altering the behavior of a web page, or web application, with custom callbacks.

One or more embodiments advantageously provide method of establishing external feeds between information sources 318 and a cloud platform 302 (e.g., cloud computing environment with layers as in FIG. 2 wherein software components of event-based computing system 304 reside as a workload 96) over a communication network.

Given the discussion thus far, it will be appreciated that, in general terms, an exemplary method, according to an aspect of the invention, includes receiving, at a cloud platform 302, a class of feed for an external feed 320 corresponding to an information source 318 (the external feed to produce a corresponding class of events). For example, feed provider 318 provides system 304 on platform 302 with a class characterizing its feed 320. The skilled artisan will appreciate that a feed is defined as an abstract data type that produces a "class of events." A further step includes receiving, at the cloud platform, an instruction 326 corresponding to a create operation for the external feed (e.g., from an end user 324 who wishes to consume the feed).

A still further step includes receiving, at the cloud platform, a dictionary input 314 corresponding to parameters expected by the information source 318. In one or more embodiments, the dictionary input is provided by the end user 324 (person who desires to consume the feed) and flows to the cloud platform.

Yet a further step includes selecting, at the cloud platform, a handler 312 based on the received class of feed and the received create operation. Recall that in one or more embodiments, the feed provider 318 defines a handler 312 for each of the lifecycle events associated for the feed provider's feed, or alternatively, the feed provider can provide a single handler, which responds to the various lifecycle events as appropriate for each event. Thus, selecting a handler based on the received class of feed and the received create operation includes, in this instance, selecting the handler for the CREATE operation and the particular class of feed, or selecting the single handler used for all of CREATE, DELETE, PAUSE, and RESUME the particular class of feed and providing it with whatever parameters it needs to respond appropriately to the CREATE event.

Even further steps include transferring, to the handler 312 on the cloud platform, the input dictionary 314; and generating, at the cloud platform, a unique destination to receive events for the class of events. In a non-limiting example, this generating includes generating a unique Uniform Resource Locator (URL) 316 and the events are received via a call to the uniform resource locator (URL). As noted above, a feed is defined as an abstract data type that produces a "class of events"—thus, when setting up a destination, the destination is for a class of events.

As used herein, a "destination" refers to a web endpoint where the external information source can send events; generally a mechanism which can listen for events.

Another step includes generating, by the selected handler (say, $H_2$ out of the M handlers 312) on the cloud platform, a unique request to the information source 318 to generate events of the class of feed to the unique destination (e.g. URL 316). Yet further steps include sending, by the handler on the cloud platform, the request to the information source 318; and receiving, at the unique destination (e.g. URL 316), events generated from the information source 318 responsive to the unique request.

In the step of receiving the class of feed, the class of feed can be content-based and/or topic-based.

As noted, embodiments are not limited to CREATE operations. Thus, in some instances, further steps include receiving, at the cloud platform 302, an instruction corresponding to a delete operation for the external feed (e.g. from user 324); selecting, at the cloud platform 302, an appropriate handler 312 based on the received class of feed and the received delete operation; running the appropriate handler 312 on the cloud platform 302; and stopping receipt of information from the information source 318.

Furthermore in this regard, in some instances, further steps include receiving, at the cloud platform 302, an instruction corresponding to a pause operation for the external feed (e.g. from user 324); selecting, at the cloud platform 302, an appropriate handler 312 based on the received class of feed and the received pause operation; running the appropriate handler 312 on the cloud platform 302; and pausing receipt of information from the information source 318. In at least some such instances, even further steps include, subsequent to the pausing, receiving, at the cloud platform 302, an instruction corresponding to a resume operation for the external feed (e.g. from user 324); selecting, at the cloud platform 302, another handler 312 based on the received class of feed and the received resume operation; running the other handler 312 on the cloud platform 302; and resuming receipt of information from the information source 318. Again, it should be kept in mind that the feed provider 318 may define a handler 312 for each of the lifecycle events associated for the feed provider's feed, or alternatively, the feed provider can provide a single handler, which responds to the various lifecycle events as appropriate for each event.

Furthermore, given the discussion thus far, it will be appreciated that, in general terms, an exemplary non-transitory computer readable medium includes computer executable instructions which when executed by a computer cause the computer to perform a method of establishing external feeds between information sources and a cloud platform over a communication network, as set forth above.

Yet further, given the discussion thus far, it will be appreciated that, in general terms, an exemplary system includes a memory; at least one processor, coupled to the memory; and a non-transitory computer readable medium comprising computer executable instructions which when loaded into the memory configure the at least one processor to be operative to perform a method of establishing external feeds between information sources and a cloud platform over a communication network, as set forth above.

Figure 8:
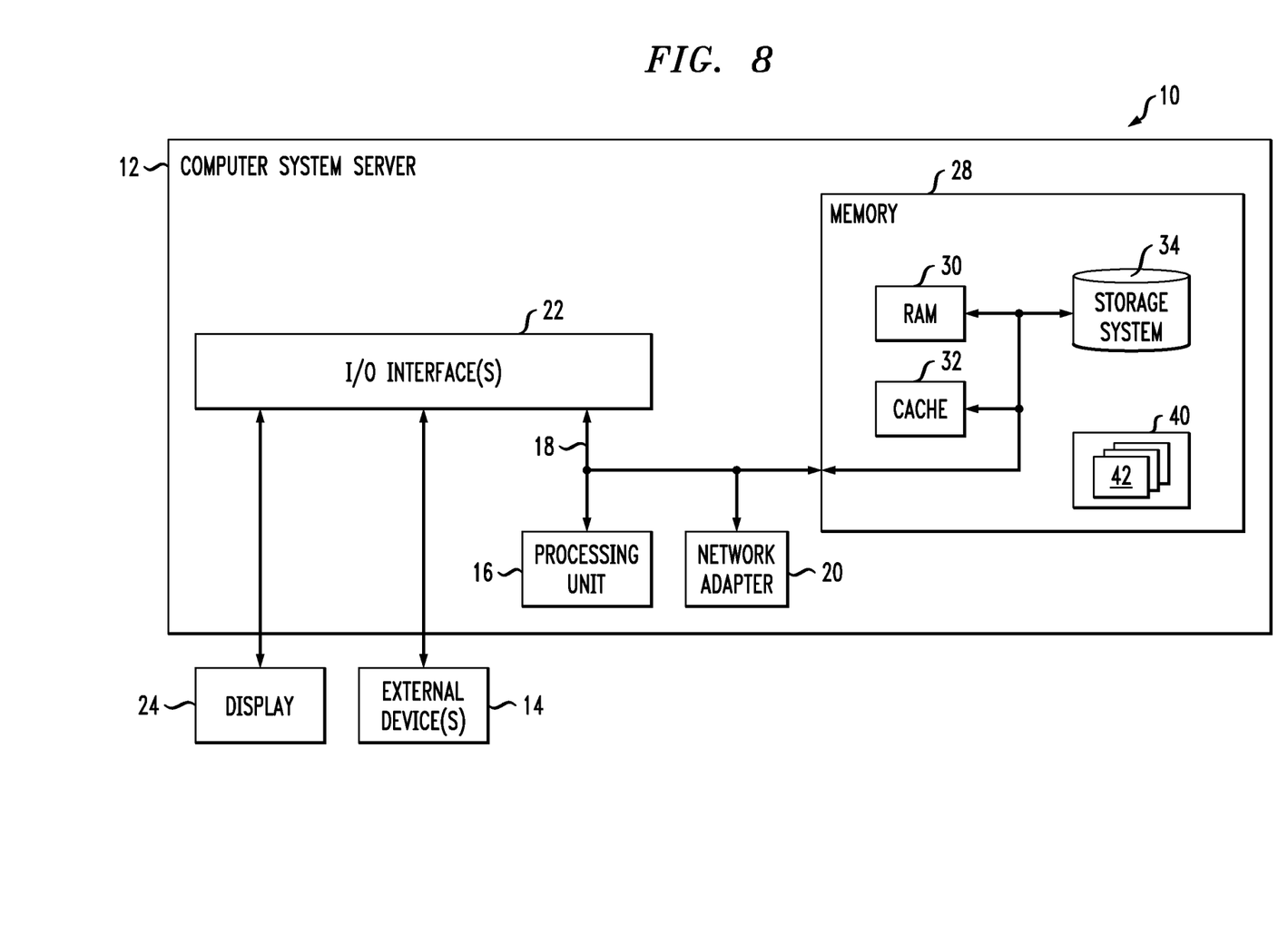
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard. Note that while FIG. 8 shows is representative of a server, it is also representative of a variety of other computer systems, and some embodiments of the invention are implemented in a serverless fashion, as discussed herein.

One or more embodiments can be at least partially implemented in the context of a cloud or virtual machine environment, although this is exemplary and non-limiting. Reference is made back to FIGS. 1-2 and accompanying text. Consider, e.g., a cloud computing environment with layers as in FIG. 2 wherein software components of event-based computing system 304 reside as a workload 96 in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described (e.g., in FIGS. 3, 5, and 6). The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI). Other types of user interface can be employed. Some embodiments can employ a command line interface.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  receiving, at a cloud platform, a class of feed for an external feed corresponding to an information source, said external feed to produce a corresponding class of events, said class of feed being based on a model;
  receiving, at said cloud platform, an instruction corresponding to a create operation for said external feed;
  receiving, at said cloud platform, input corresponding to parameters expected by said information source;
  selecting, at said cloud platform, a handler from a plurality of handlers based on said received class of feed and said received create operation, each handler being responsive to lifecycle events on said external feed transparent to a user;
  transferring, to said handler on said cloud platform, said input;
  generating, at said cloud platform, a unique destination to receive events for said class of events;

generating, by said handler on said cloud platform, a unique request to said information source to generate events of said class of feed to said unique destination transparent to said user;

sending, by said handler on said cloud platform, said request to said information source; and receiving, at said unique destination, events generated from said information source responsive to said unique request.

2. The method of claim 1, wherein in said step of receiving said class of feed, said class of feed is content-based.

3. The method of claim 1, wherein in said step of receiving said class of feed, said class of feed is topic-based.

4. The method of claim 1, further comprising:
receiving, at said cloud platform, an instruction corresponding to a delete operation for said external feed;
selecting, at said cloud platform, an appropriate handler based on said received class of feed and said received delete operation;
running said appropriate handler on said cloud platform; and
stopping receipt of information from said information source.

5. The method of claim 1, further comprising:
receiving, at said cloud platform, an instruction corresponding to a pause operation for said external feed;
selecting, at said cloud platform, an appropriate handler based on said received class of feed and said received pause operation;
running said appropriate handler on said cloud platform; and
pausing receipt of information from said information source.

6. The method of claim 5, further comprising, subsequent to said pausing:
receiving, at said cloud platform, an instruction corresponding to a resume operation for said external feed;
selecting, at said cloud platform, another handler based on said received class of feed and said received resume operation;
running said other handler on said cloud platform; and
resuming receipt of information from said information source.

7. The method of claim 1, wherein said generating of said unique destination comprises generating a unique uniform resource locator (URL) and said events are received via a call to said uniform resource locator (URL).

8. A non-transitory computer readable medium comprising computer executable instructions which when executed by a computer cause the computer to perform the method of:
receiving, at a cloud platform, a class of feed for an external feed corresponding to an information source, said external feed to produce a corresponding class of events, said class of feed being based on a model;
receiving, at said cloud platform, an instruction corresponding to a create operation for said external feed;
receiving, at said cloud platform, input corresponding to parameters expected by said information source;
selecting, at said cloud platform, a handler from a plurality of handlers based on said received class of feed and said received create operation, each handler being responsive to lifecycle events on said external feed transparent to a user;
transferring, to said handler on said cloud platform, said input;

generating, at said cloud platform, a unique destination to receive events for said class of events transparent to said user;

generating, by said handler on said cloud platform, a unique request to said information source to generate events of said class of feed to said unique destination;

sending, by said handler on said cloud platform, said request to said information source; and receiving, at said unique destination, events generated from said information source responsive to said unique request.

9. The non-transitory computer readable medium of claim 8, wherein in said step of receiving said class of feed, said class of feed is content-based.

10. The non-transitory computer readable medium of claim 8, wherein in said step of receiving said class of feed, said class of feed is topic-based.

11. The non-transitory computer readable medium of claim 8, further comprising:
receiving, at said cloud platform, an instruction corresponding to a delete operation for said external feed;
selecting, at said cloud platform, an appropriate handler based on said received class of feed and said received delete operation;
running said appropriate handler on said cloud platform; and
stopping receipt of information from said information source.

12. The non-transitory computer readable medium of claim 8, further comprising:
receiving, at said cloud platform, an instruction corresponding to a pause operation for said external feed;
selecting, at said cloud platform, an appropriate handler based on said received class of feed and said received pause operation;
running said appropriate handler on said cloud platform; and
pausing receipt of information from said information source.

13. The non-transitory computer readable medium of claim 12, further comprising, subsequent to said pausing:
receiving, at said cloud platform, an instruction corresponding to a resume operation for said external feed;
selecting, at said cloud platform, another handler based on said received class of feed and said received resume operation;
running said other handler on said cloud platform; and
resuming receipt of information from said information source.

14. The non-transitory computer readable medium of claim 8, wherein said generating of said unique destination comprises generating a unique uniform resource locator (URL) and said events are received via a call to said uniform resource locator (URL).

15. An apparatus comprising:
a memory;
at least one processor, coupled to said memory, and
a non-transitory computer readable medium comprising computer executable instructions which when loaded into said memory configure said at least one processor to be operative to:
receive, at a cloud platform, a class of feed for an external feed corresponding to an information source, said external feed to produce a corresponding class of events, said class of feed being based on a model;

receive, at said cloud platform, an instruction corresponding to a create operation for said external feed;

receive, at said cloud platform, input corresponding to parameters expected by said information source;

select, at said cloud platform, a handler from a plurality of handlers based on said received class of feed and said received create operation, each handler being responsive to lifecycle events on said external feed transparent to a user;

transfer, to said handler on said cloud platform, said input;

generate, at said cloud platform, a unique destination to receive events for said class of events;

generate, by said handler on said cloud platform, a unique request to said information source to generate events of said class of feed to said unique destination transparent to said user;

send, by said handler on said cloud platform, said request to said information source; and receive, at said unique destination, events generated from said information source responsive to said unique request.

16. The apparatus of claim 15, wherein said class of feed is content-based.

17. The apparatus of claim 15, wherein said class of feed is topic-based.

18. The apparatus of claim 15, wherein said computer executable instructions, when loaded into said memory, further configure said at least one processor to be operative to:

receive, at said cloud platform, an instruction corresponding to a delete operation for said external feed;

select, at said cloud platform, an appropriate handler based on said received class of feed and said received delete operation;

run said appropriate handler on said cloud platform; and stop receipt of information from said information source.

19. The apparatus of claim 15, wherein said computer executable instructions, when loaded into said memory, further configure said at least one processor to be operative to:

receive, at said cloud platform, an instruction corresponding to a pause operation for said external feed;

select, at said cloud platform, an appropriate handler based on said received class of feed and said received pause operation;

run said appropriate handler on said cloud platform;

pause receipt of information from said information source;

subsequent to said pausing, receive, at said cloud platform, an instruction corresponding to a resume operation for said external feed;

subsequent to said pausing, select, at said cloud platform, another handler based on said received class of feed and said received resume operation;

subsequent to said pausing, run said other handler on said cloud platform; and subsequent to said pausing, resume receipt of information from said information source.

20. The apparatus of claim 15, wherein said computer executable instructions, when loaded into said memory, configure said at least one processor such that said generating of said unique destination comprises generating a unique uniform resource locator (URL) and said events are received via a call to said uniform resource locator (URL).

* * * * *